US008505179B2

(12) United States Patent
Groenenboom et al.

(10) Patent No.: US 8,505,179 B2
(45) Date of Patent: Aug. 13, 2013

(54) METHODS FOR REFURBISHING A WEB CARTRIDGE

(75) Inventors: Mark D. Groenenboom, Vancouver, WA (US); Antonio Gomez, Vancouver, WA (US); Tanya V. Burmeister, Vancouver, WA (US); Kenneth Rufe, Camas, WA (US); Stephanie Seaman, Portland, OR (US); Russell P. Yearout, Brush Prairie, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1788 days.

(21) Appl. No.: 11/717,823

(22) Filed: Mar. 14, 2007

(65) Prior Publication Data

US 2008/0222870 A1 Sep. 18, 2008

(51) Int. Cl.
*B23Q 17/00* (2006.01)

(52) U.S. Cl.
USPC .................. 29/402.08; 29/402.09; 29/402.03; 29/402.01; 399/12; 347/22; 347/29

(58) Field of Classification Search
USPC ............... 29/402.01, 402.03, 402.08, 402.09, 29/407.1, 407.09, 407.11; 347/22, 29, 33; 399/12
See application file for complete search history.

(56) References Cited

U.S. PATENT DOCUMENTS

| | | | |
|---|---|---|---|
| 4,928,120 A | 5/1990 | Spehrley, Jr. et al. | |
| 6,382,767 B1 | 5/2002 | Greive | |
| 6,692,100 B2 | 2/2004 | Steinfield et al. | |
| 6,695,429 B2 | 2/2004 | Barinaga | |
| 2006/0209122 A1 | 9/2006 | Barinaga et al. | |
| 2006/0209152 A1 * | 9/2006 | Baringa et al. | 347/104 |

* cited by examiner

*Primary Examiner* — David Bryant
*Assistant Examiner* — Bayan Salone

(57) ABSTRACT

One embodiment of a method for refurbishing a web cartridge includes separating a web extending between first and second spools from the first spool and winding the separated web onto the second spool. The first and second spools are removed from a housing. A replacement first spool having a replacement web is obtained, and an end of the replacement is fed web through a web guide. A portion of the replacement web is then affixed to a replacement second spool.

14 Claims, 5 Drawing Sheets

FIG. 1
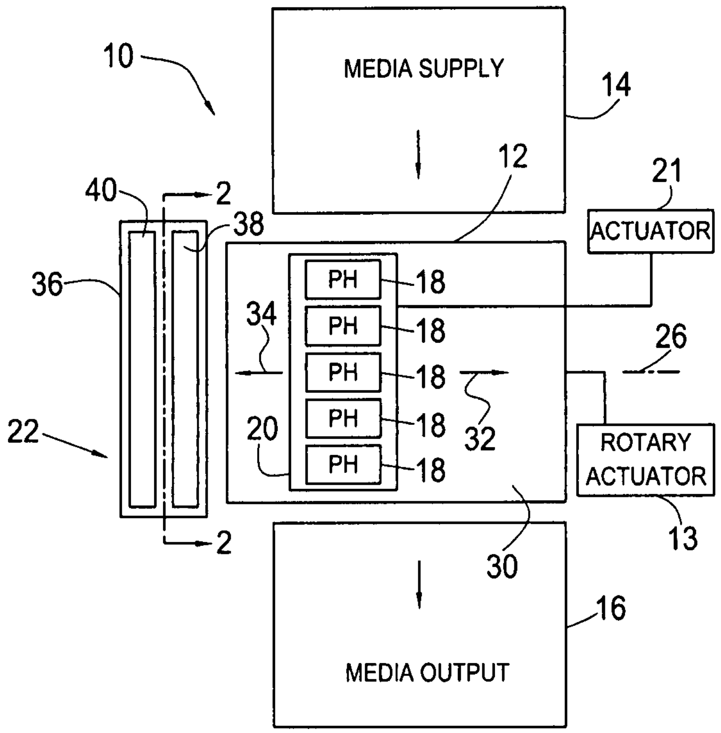
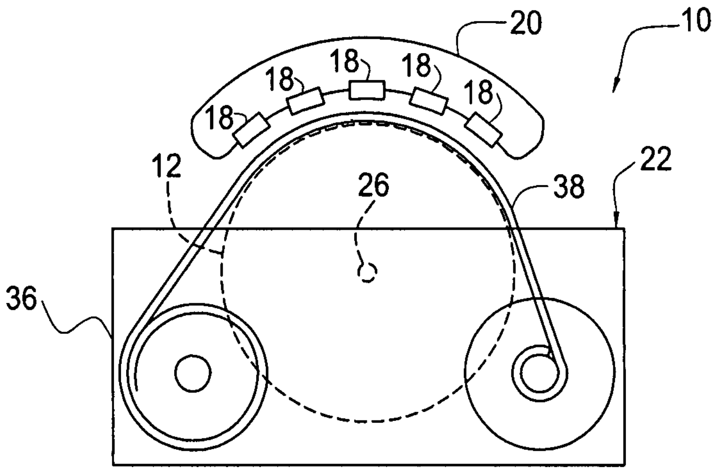
FIG. 2

METHODS FOR REFURBISHING A WEB CARTRIDGE

BACKGROUND OF THE INVENTION

Inkjet printing technology is used in many commercial products such as computer printers, graphics plotters, copiers and facsimile machines. Generally, inkjet printing employs a fluid ejection device, commonly referred to as a printhead, which ejects drops of ink or other imaging material through a plurality of nozzles onto a print medium such as paper.

Image quality can deteriorate after repeated uses due to printhead surfaces being fouled with ink residue, paper dust or other debris and/or the nozzles becoming clogged with dried imaging material. It is thus common for printing systems to have a service station at which various operations, such as wiping, spitting and capping, are performed on the printheads to maintain printhead health. Wiping generally comprises moving a wiper of a specified material across the printhead surface to remove debris therefrom. Spitting involves periodically firing a number of drops of imaging material through the nozzles to prevent clogs from forming in the nozzles. The ejected imaging material is typically collected by an absorber or a waste receiver commonly called a spittoon. Capping refers to covering the printhead during non-operational periods to seal the printhead from contaminants. Capping also prevents ink on the printhead and in the nozzles from drying and is typically accomplished using a sealing enclosure, such as a rubber seal, placed around the nozzle array.

Refurbishment of traditional service stations involves replacing absorbers saturated and coated with waste ink and replacing old, inky wipers. Additional cleaning of migrated ink is often needed. With absorber based waste ink containment, ink buildups (stalagmites) form on the absorber surfaces and are exposed during refurbishment and cleaning. Exposure of the gooey ink residue makes refurbishment a messy and complicated process, and risks contamination and damage of printing components.

DESCRIPTION OF THE DRAWINGS

FIG. 1 is a schematic depiction of one embodiment of a printing system.

FIG. 2 is a sectional view of the printing system taken along line 2-2 of FIG. 1.

DETAILED DESCRIPTION OF THE INVENTION

Figure 3:
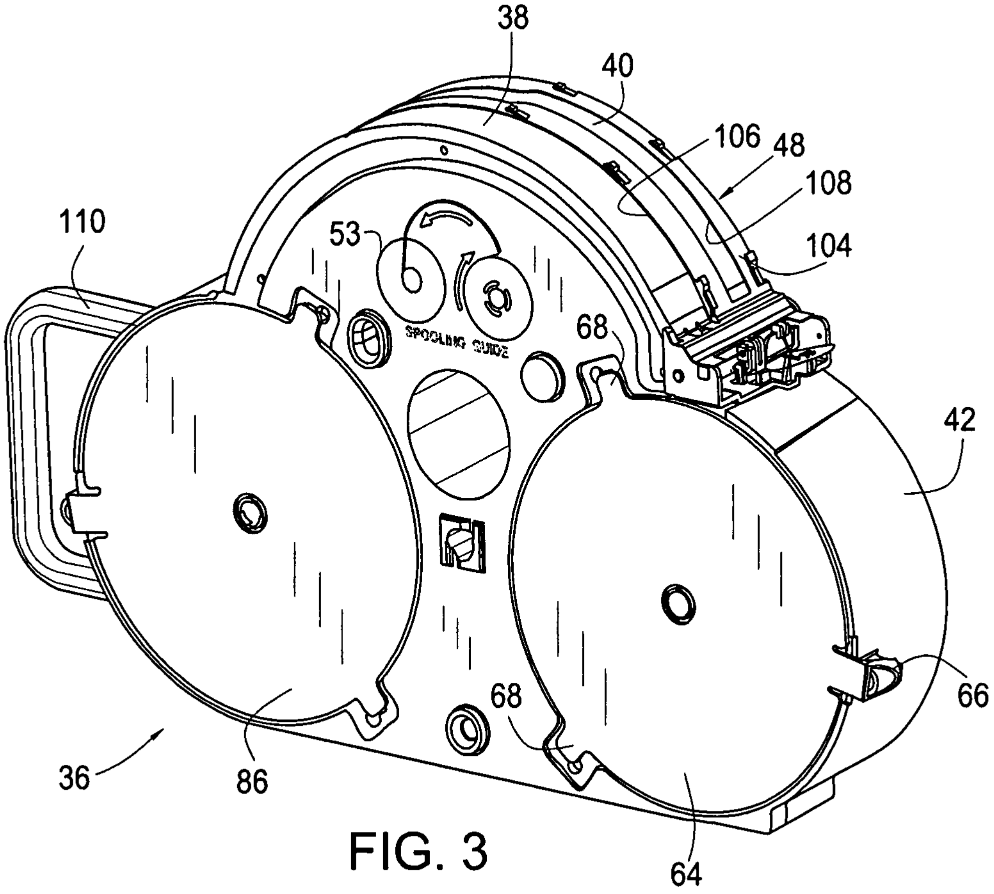
FIG. 3 is a perspective view of one embodiment of a web cartridge.

Referring to the drawings wherein identical reference numerals denote the same elements throughout the various views, FIGS. 1 and 2 schematically illustrate a printing system 10 according to one exemplary embodiment. The printing system 10 generally includes a drum 12, a rotary actuator 13, a media supply 14, a media output 16, a plurality of printheads 18, a carriage 20, an actuator 21, and a service station 22. The drum 12 generally comprises an elongated cylinder configured to be rotatively driven about its longitudinal axis 26 by the rotary actuator 13 while transporting media, such as paper, about the axis 26 relative to the printheads 18. The rotary actuator 13 comprises a source of torque, such as a motor, operably coupled to the drum 12 by a transmission (not shown). Although the exemplary printing system 10 described herein is a drum printer, it should be noted that the present invention is not limited to drum printers and is applicable to many types of printing systems.

The media supply 14, schematically shown, comprises a mechanism configured to supply media to the drum 12. In one embodiment, the media supply 14 comprises a mechanism configured to pick an individual sheet of media from a stack of media and to supply the individual sheet to the drum 12 such that the sheet is wrapped at least partially about the drum 12. The media output 16, schematically shown, comprises a mechanism to withdraw printed upon media from the drum 12 and to transport the withdrawn media to an output tray, bin or the like.

The printheads 18 are configured to dispense imaging material, such as ink, upon the medium held by the drum 12. Generally, each printhead 18 includes a plurality of nozzles (not shown) and fluid ejectors (not shown) that cause drops of imaging material to be ejected through the nozzles. The fluid ejectors can be any device, such a resistor or piezoelectric actuator, capable of inducing drops of imaging material to be ejected through the nozzles. As shown by FIG. 2, the printheads 18 are arranged in an arc about the axis 26. As a result, the printheads 18 are configured to print across a large area of the media supported by the drum 12. In the illustrated embodiment, the drum 12 has a cylindrical outer surface 30, and the printheads 18 are arranged in an arc that is substantially concentric to the outer surface 30.

The carriage 20 comprises one or more structures configured to support the printheads 18 in the arcuate arrangement. In addition, the carriage 20 is configured to movably position the printheads 18 along the axis 26. The actuator 21 comprises a linear actuator configured to move the carriage 20 and the printheads 18 in the directions indicated by arrows 32, 34 (i.e., along the axis 26) so as to selectively position the printheads 18 relative to the media held by the drum 12 or over the service station 22. In one embodiment, the actuator 21 may comprise a motor configured to drive a toothed pulley in engagement with a toothed belt coupled to the carriage 20. In another embodiment, the actuator 21 may comprise other forms of a linear actuator using rack and pinion arrangements, hydraulic, pneumatic or electrical means. Although the printing system 10 is illustrated as including five printheads 18 supported by a single carriage 20, the printing system 10 may alternatively include a greater or lesser number of such printheads 18 supported by one or more carriages 20.

The service station 22 is located on an axial end of the drum 12 such that the carriage 20 may position printheads 18 over, or in alignment with, the service station 22. The service station 22 includes one or more components configured to perform servicing operations upon one or more of the printheads 18. As shown in FIG. 1, the service station 22 includes a web cartridge 36 having two webs 38, 40 of material for performing servicing operations upon the printheads 18. The service station 22 also includes means, such as a frame or chassis, for removably holding the web cartridge 36 in position. In one embodiment, the web 38 is configured to interact with the printheads 18 by receiving printing material or ink discharged from the printheads 18 to facilitate spitting of imaging material such as ink from the nozzles to clear such nozzles. The web 38 is thus referred to as the spit web. The spit web 38 can comprise a web of fluid absorbent material, such as a fabric material.

In the illustrated embodiment, the web 40 comprises a web of material configured to physically contact the surfaces of the printheads 18 so as to wipe the printheads 18. The web 40 is thus referred to as the wipe web. For example, the wipe web 40 can be configured to contact the surfaces of the printheads 18 as the carriage 20 moves the printheads 18 along the axis 26 relative to the wipe web 40 to wipe the printheads 18. In other embodiments, the wipe web 40 may additionally be configured to be moved longitudinally relative to the printheads 18 to perform such wiping operations. According to one embodiment, the wipe web 40 is formed from a fabric material such as Evolon 100, commercially available from Freudenberg Group of Germany. As an alternative to separate spit and wipe webs, the web cartridge 36 could be configured to have a single web used for both the spitting and wiping functions.

Figure 4:
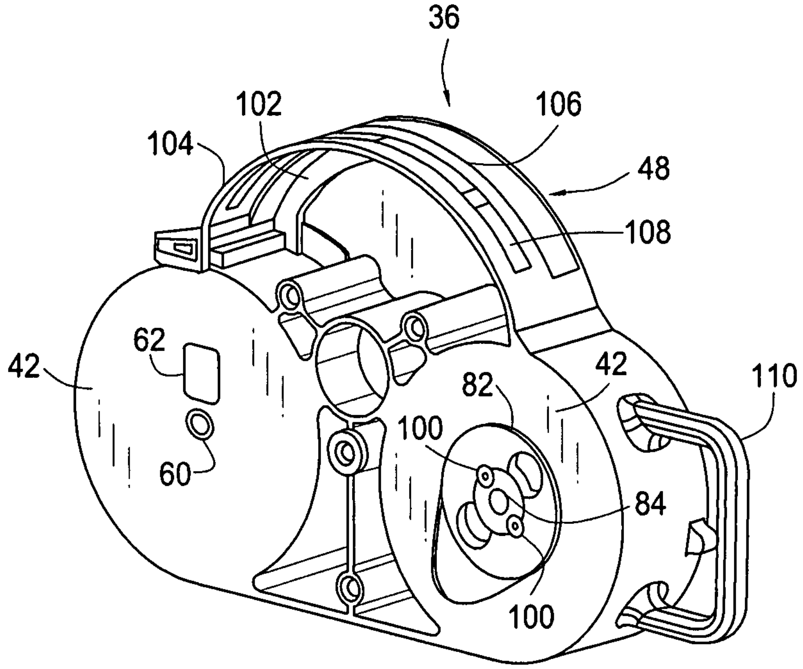
FIG. 4 is another perspective view of the web cartridge of FIG. 3.
Figure 5:
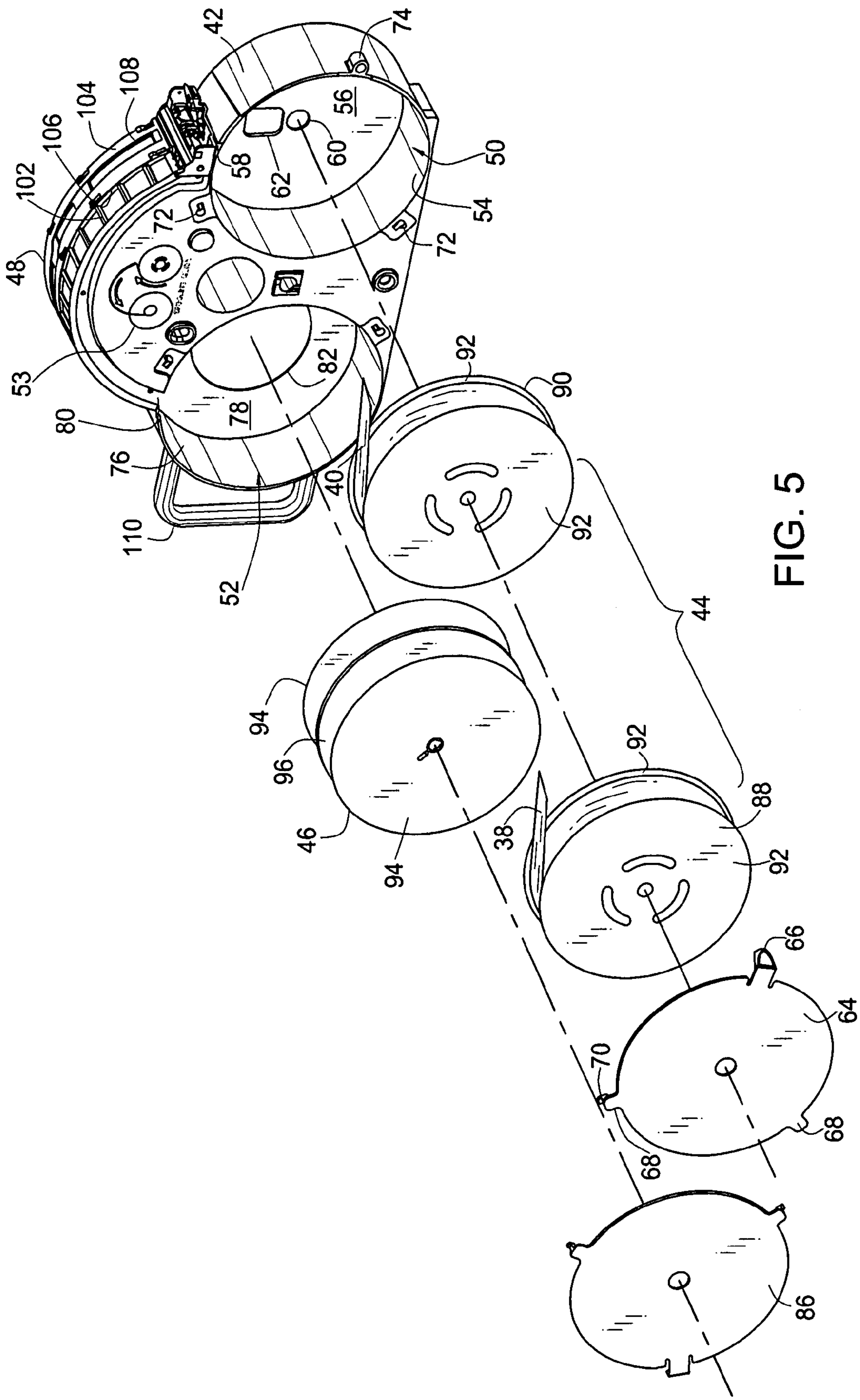
FIG. 5 is an exploded perspective view of the web cartridge of FIG. 3.

Turning to FIGS. 3-5, one embodiment of the web cartridge 36 is shown in more detail. The web cartridge 36 includes a housing 42 for holding a supply spool assembly 44 and a take up spool assembly 46. The webs 38 and 40 are initially wound on the supply spool assembly 44 and are taken up on the take up spool assembly 46. An arcuate web guide 48 is provided to guide the unwinding of the webs 38 and 40 from the supply spool assembly 44 to the take up spool assembly 46. In the illustrated embodiment, the housing 42 has one or more walls or structures that define a first spool chamber 50 that receives the supply spool assembly 44, and a second spool chamber 52 that receives the take up spool assembly 46. The housing 42 can have a spooling guide diagram 53 imprinted there on that shows the layout of the spool assemblies and the webs.

The first spool chamber 50 includes a generally cylindrical sidewall 54 and a rear wall 56. A web slot 58 is formed in the cylindrical sidewall 54 to provide passage for the webs 38 and 40 between the first spool chamber 50 and the web guide 48. The rear wall 56 includes a spindle opening 60 and a viewing window 62. When the web cartridge 36 is installed in the service station 22, a spindle (not shown) from the service station 22 is received through the spindle opening 60 to engage and rotatively support the supply spool assembly 44. The viewing window 62 enables an operator to view the amount of web that remains wound on the supply spool assembly 44. A first chamber cover 64 is provided for covering the first spool chamber 50 and enclosing the supply spool assembly 44 therein. The first chamber cover 64 generally comprises a plate configured to be releasably mounted to the housing 42. In the illustrated embodiment, the first chamber cover 64 comprises a generally circular panel having a catch 66 and two tabs 68 equally spaced about the circumference thereof. Each tab 68 has a hook 70 formed thereon that engages a corresponding slot 72 formed in the housing 42, adjacent to the first spool chamber 50. The catch 66 engages a protrusion 74 formed on the housing 42 to secure the first chamber cover 64 to the housing 42. Other means for securing the first chamber cover 64 to the housing 42, such as screws or other fasteners, could also be used.

The second spool chamber 52 is similar to the first spool chamber 50 and includes a generally cylindrical sidewall 76 and a rear wall 78. A web slot 80 is formed in the cylindrical sidewall 76 to provide a passage between the second spool chamber 52 and the web guide 48. The rear wall 78 includes an opening 82 through which a torque interface 84 (described in more detail below) formed on the take up spool assembly 46 extends. This allows torque to be transmitted across the rear wall 78 to the take up spool assembly 46 when the web cartridge 36 is installed in the service station 22. A second chamber cover 86 is provided for covering the second spool chamber 52 and enclosing the take up spool assembly 46 therein. The second chamber cover 86 can be configured generally the same as the first chamber cover 64 to be releasably mounted to the housing 42. Although the two spool chambers 50 and 52 are illustrated as forming generally cylindrical cavities, the spool chambers 50 and 52 may alternatively form a single continuous cavity in which the spool assemblies 44 and 46 are received.

The supply and take up spool assemblies 44 and 46 are both configured to support the two webs 38 and 40 in a side-by-side manner. As shown in FIG. 5, the supply spool assembly 44 can comprise two individual spools 88 and 90 connected by an axle (not shown) for rotation about the same axis, wherein the first spool 88 carries the spit web 38 and the second spool 90 carries the wipe web 40. Each spool 88, 90 comprises a cylindrical hub (not shown), about which that spool's web is wound, and a flange 92 formed on each end of the hub for enclosing the web winding. The flanges 92 can be provided with a low friction surface, thereby facilitating unwinding or winding of the webs 38 and 40. As also shown in FIG. 5, the take up spool assembly 46 can comprise a single spool including a cylindrical hub (not shown) having a flange 94 formed on each end. The webs 38 and 40 are both wound on the hub, and an annular divider 96 formed on the hub separates the two web windings. The flanges 94 and the divider 96 can be provided with low friction surfaces to facilitate unwinding or winding of the webs 38 and 40. While the supply spool assembly 42 is shown as being a dual-spool assembly and the take up spool assembly 46 is shown as a single-spool assembly, it should be noted that either spool assembly can be configured as a single-spool or dual-spool assembly.

The take up spool assembly 46 further includes a torque interface 84 fixed thereon. When the take up spool assembly 46 is installed in the second spool chamber 52, the torque interface 84 extends through the opening 82 in the rear wall 78. The torque interface 84 is thus able to engage a source of torque (e.g., a motor) located in the service station 22 so that torque can be transmitted to rotatively drive the take up spool assembly 46 and advance the webs 38 and 40. The take up spool assembly 46 is thus also referred to as the drive spool assembly. In the illustrated embodiment, the torque interface 84 comprises a gear that establishes meshing engagement with a transmission gear connected to the torque source when the web cartridge 36 is properly engaged in the service station 22. The torque interface 84 further includes tabs 100 that facilitate manual operation.

The web guide 48 comprises one or more structures configured to support the webs 38 and 40 in an arc opposite to the printheads 18 for servicing of the printheads 18. In the illustrated embodiment, the web guide 48 comprises an elongate, arcuate track 102 formed on top of the housing 42 and a cover 104 mounted on top of the track 102. The track 102 and cover 104 cooperate to guide and retain the webs 38 and 40. Specifically, the webs 38 and 40 pass between the track 102 and the cover 104, with the track 102 underlying the webs 38, 40. The cover 104 has a notch 106 formed lengthwise along one edge thereof for exposing the spit web 38 and a slot 108 formed lengthwise therein, substantially parallel to the notch 106, for exposing the wipe web 40.

The web cartridge 36 further includes a handle 110 formed thereon by which an operator can grasp the web cartridge 36 to insert or remove the web cartridge 36 from the service station 22. In the particular example shown, the handle 110 comprises a U-shaped structure affixed to housing 42.

To service the printheads 18, the actuator 21 is activated to move the carriage 20 over the service station 22. In one service operation, the carriage 20 is positioned so that the printheads 18 are aligned over the wipe web 40. As the wipe web 40 is moved into contact with the surfaces of the printheads 18, the printheads 18 are moved relative to the wipe web 40 to wipe the printheads 18. The relative movement can be accomplished by moving the carriage 20 and the printheads 18 along the axis 26 relative to the wipe web 40, and/or by activating the torque source in the service station 22 to rotate the take up spool assembly 46 and move the wipe web 40 longitudinally relative to the printheads 18. The wipe web 40 absorbs the imaging material wiped from the surfaces of the printheads 18.

In another service operation, the carriage 20 is positioned so that the printheads 18 are aligned over the spit web 38. Once positioned opposite the spit web 38, the printheads 18 may be actuated to discharge or spit imaging material onto the spit web 38 so as to clear the printhead nozzles. The spit web 38 absorbs the imaging material discharged from the printheads 18. It should be noted that the wiping and spitting operations need not be carried out in any particular order. Upon completion of these two servicing operations, the service station's source of torque can be activated to rotatively drive the take up spool assembly 46 so as to advance the two webs 38 and 40. The saturated portions of the webs 38 and 40 are thus taken up on the take up spool assembly 46 and clean, unused portions of the webs 38 and 40 are positioned in the web guide 48.

When all or most of the webs 38 and 40 have been transferred from the supply spool assembly 44 to the take up spool assembly 46, a service technician can remove the used webs 38 and 40 and replace them with new replacement webs so that the web cartridge 36 can again be used for servicing and maintaining printhead health.

One embodiment of a process for refurbishing the web cartridge 36 is now described. The process begins by removing the web cartridge 36 needing refurbishment from the service station 22. The first chamber cover 64 is then removed to expose the used supply spool assembly 44 in the first spool chamber 50. The cover removal can be accomplished by releasing the catch 66 and rotating the first chamber cover 64 to release the hooks 70 from their slots 72. The spit web 38 is then severed, typically with a pair of scissors, at the top of the supply spool assembly 44 adjacent to the web slot 58 to separate the spit web 38 from the supply spool assembly 44, and the first spool 88 is removed from the first spool chamber 50. Next, the wipe web 40 is also cut at the top of the supply spool assembly 44 adjacent to the web slot 58, and the second spool 90 is then removed from the first spool chamber 50. The first and second spools 88 and 90 are typically discarded. A possible alternative technique for separating the webs 38 and 40 from the supply spool assembly 44 would be to completely unwind the webs 38 and 40 from the supply spool assembly 44 and wind them onto the take up spool assembly 46 while the web cartridge 36 is still in the service station 22. This would eliminate the web severing steps.

Next, the technician manually rotates the torque interface 84 (using the two tabs 100) so as to wind up the used webs 38 and 40 through the web guide 48 and onto the take up spool assembly 46. The technician obtains a replacement supply spool assembly 44, comprising replacement first and second spools 88, 90 having replacement webs 38 and 40 wound respectively thereon. The outer end of each replacement web 38, 40 is hardened to form a leader that assists in feeding the webs into the housing 42. Each web leader also includes an adhesive portion covered by a protective cover film. The replacement supply spool assembly 44 is typically stored in a bag. The technician removes the replacement supply spool assembly 44 from the bag and sets the bag aside. The second chamber cover 86 is removed to expose the used take up spool assembly 46 in the second spool chamber 52. The used take up spool assembly 46 (having the used webs 38 and 40 wound thereon) is then removed from the second spool chamber 52. The removed take up spool assembly 46 can be placed into the bag to contain loose web ends and ink from the webs, thereby minimizing messiness. The bag containing the take up spool assembly 46 is then properly disposed of.

At this point, the technician can clean off any ink or other imaging material on the web guide cover 104, typically using a lint-free wipe. Imaging material on the inside track 102 of the web guide 48 can be cleaned off at this point, although this imaging material can also be ignored.

Figure 6:
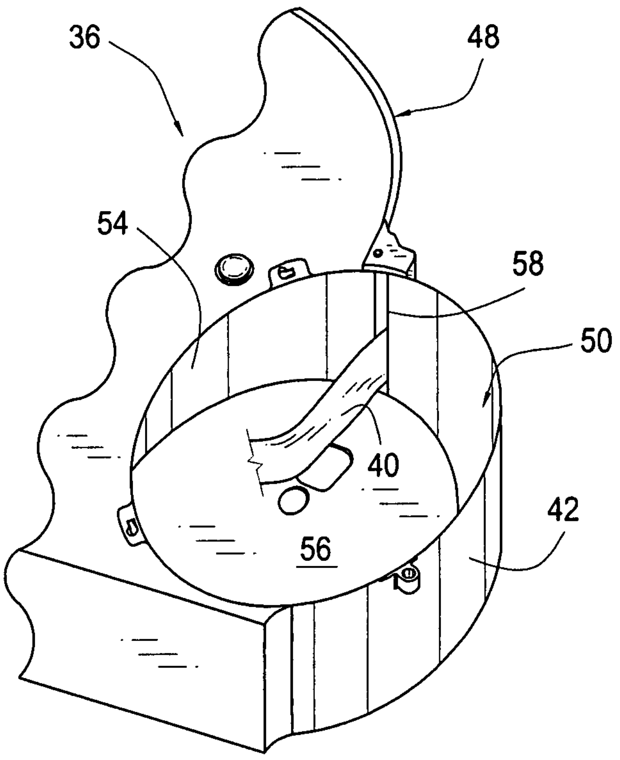
FIG. 6 illustrates one step in a process for refurbishing a web cartridge.
Figure 7:
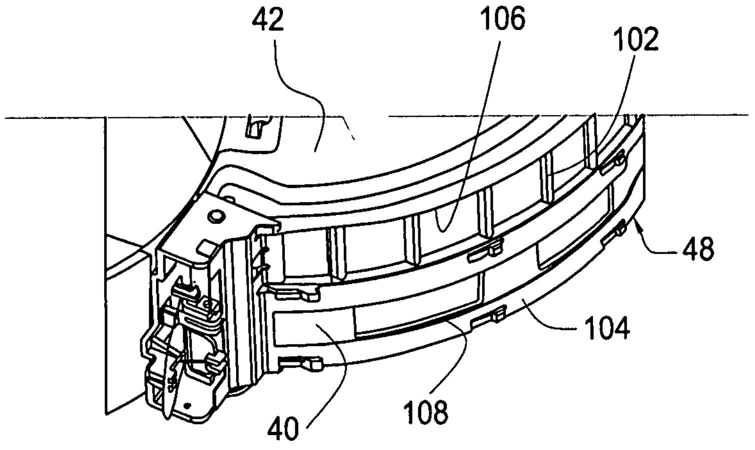
FIG. 7 illustrates another step in a process for refurbishing a web cartridge.

Next, referring to the spooling guide diagram 53 for assistance, the technician installs the replacement webs 38 and 40 into the cartridge housing 42. To install the wipe web 40, the technician takes the replacement second spool 90, which has the wipe web 40 wound thereon, and frees or releases the wipe web leader. Laying the housing 42 on its back, the technician feeds the wipe web leader from within the first spool chamber 50 through the web slot 58 as shown in FIG. 6. The wipe web leader thus enters the web guide 48 and is visible through the cover slot 108, as shown in FIG. 7. With the second spool 90 in the proper orientation and no twists in the wipe web 40, the second spool 90 is placed into the first spool chamber 50.

Figure 8:
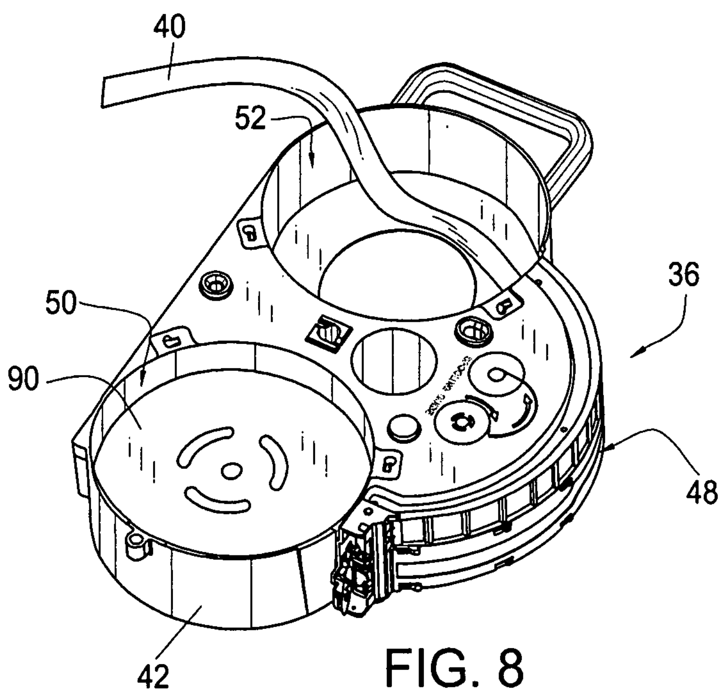
FIG. 8 illustrates yet another step in a process for refurbishing a web cartridge.

Standing the housing 42 up, the wipe web 40 is accessed through the cover slot 108 and manually pulled through the web guide 48 to the other side of the housing 42. Any excess of the wipe web 40 should be untangled and guided into the housing 42. The wipe web leader is fed through the second web slot 80 and into the second spool chamber 52. The wipe web 40 is pulled into the second spool chamber 52 until it is smooth and flat throughout the web guide 48. A sufficient length of the wipe web 40 is pulled through into the second spool chamber 52 to permit attachment of the wipe web 40 to the take up spool assembly 46, as shown in FIG. 8.

Next, the spit web 38 is installed in substantially the same manner. That is, the technician takes the replacement first spool 88, which has the spit web 38 wound thereon, and frees or releases the spit web leader. Laying the housing 42 on its back, the technician feeds the spit web leader from within the first spool chamber 50 through the web slot 58 (above the wipe web 40) and into the web guide 48 so as to be visible through the cover notch 106. With the first spool 88 in the proper orientation and no twists in the spit web 38, the first spool 88 is placed into the first spool chamber 50, and into engagement with the second spool 90 already disposed in the first spool chamber 50.

Standing the housing 42 up, the spit web 38 is accessed through the cover notch 106 and manually pulled through the web guide 48 to the other side of the housing 42. Any excess of the spit web 38 should be untangled and guided into the housing 42. The spit web leader is fed through the second web slot 80 and into the second spool chamber 52. The spit web 38 is pulled into the second spool chamber 52 until it is smooth and flat throughout the web guide 48. A sufficient length of the spit web 38 is pulled through into the second spool chamber 52 to permit attachment of the spit web 38 to the take up spool assembly 46. At this point, the first chamber cover 64 is replaced by inserting the hooks 70 into their respective slots 72 and snapping the catch 66 over the protrusion 74.

Figure 9:
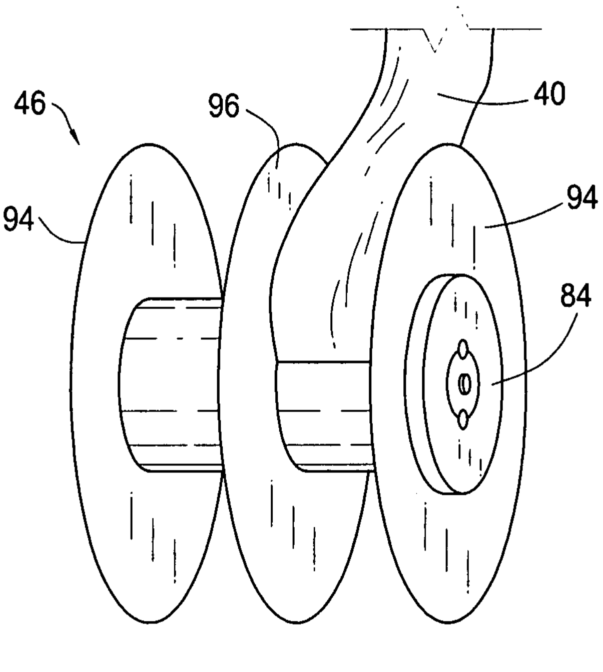
FIG. 9 illustrates a further step in a process for refurbishing a web cartridge.

The technician then obtains a replacement take up spool assembly 46 having a torque interface 84 attached. The ends of the two webs 38 and 40 are fed out of the second spool chamber 52. Starting with the wipe web 40, the protective cover is removed from the wipe web leader to expose the adhesive portion. The wipe web 40 is then affixed to the appropriate section of the replacement take up spool assembly 46 (i.e., the section closest to the torque interface 84) by placing the adhesive portion on the spool hub with the wipe web 40 having no twists and oriented as shown in the spooling guide diagram 53, as shown in FIG. 9. The protective cover of the spit web leader is then removed to expose its adhesive portion, and the spit web 38 is affixed to the other section of the take up spool assembly 46 (i.e., the section farthest from the torque interface 84) by placing the adhesive portion on the spool hub with the spit web 38 having no twists and oriented as shown in the spooling guide diagram 53.

Next, any excess of the two webs 38 and 40 is wound up on the take up spool assembly 46, and the take up spool assembly 46 is then placed into the second spool chamber 52 with the torque interface 84 extending through the opening 82. The second chamber cover 86 is then replaced to enclose the take up spool assembly 46 in the second spool chamber 52. The technician then uses the tabs 100 to manually rotate the torque interface 84, and thus the take up spool assembly 46, until both webs 38 and 40 are moving together onto the take up spool assembly 46. The movement of the webs can be visually observed through the cover notch 106 and the cover slot 108. This manual rotation takes up any web slack and provides a visual check that the spool assemblies 44 and 46 are able to rotate freely and that the webs 38 and 40 can be advanced, confirming that the webs 38 and 40 have been properly installed. At this point, the refurbishing process is completed, and the refurbished web cartridge 36 can be re-installed into the service station 22.

While specific embodiments of the present invention have been described, it should be noted that various modifications thereto can be made without departing from the spirit and scope of the invention as defined in the appended claims.

What is claimed is:

1. A method comprising:

separating a web extending between first and second spools from said first spool, wherein the web comprises a web of material configured to physically contact the surfaces of the printheads to wipe ink from the printheads or to interact with the printheads by receiving ink discharged from the printheads;

winding the separated web onto the second spool through a web guide, wherein the separated web is a portion of the web having saturated ink;

removing the first spool and the second spool having the separated web from a housing;

obtaining a replacement first spool having a replacement web wound thereon and a replacement second spool;

inserting the replacement first spool and the replacement second spool into the housing;

feeding an end of the replacement web through the web guide; and affixing a portion of the end of the replacement web to the replacement second spool.

2. The method of claim 1 further comprising assuring that there are no twists in the replacement web prior to inserting the replacement first spool and the replacement second spool into the housing.

3. The method of claim 1 further comprising cleaning the web guide prior to feeding an end of the replacement web through the web guide.

4. The method of claim 1 further comprising manually rotating the replacement second spool.

5. The method of claim 4 further comprising visually observing the replacement web advancing through the web guide while manually rotating the replacement second spool to confirm that the replacement web has been properly installed.

6. The method of claim 1 wherein the replacement web is affixed to the replacement second spool using adhesive.

7. The method of claim 1 wherein separating the web comprises severing the web.

8. A method for refurbishing a web cartridge having a supply spool assembly, a take up spool assembly and a web extending from the supply spool assembly to the take up spool assembly through a web guide, the method comprising:

separating at least one of a first web and a second web extending between supply and take up spool assembly from the supply spool assembly, wherein the supply spool assembly comprises a first spool having the first web wound thereon and a second spool having the second web wound thereon, and wherein the first or second web comprises a web of material configured to physically contact the surfaces of the printheads to wipe ink from the printheads or to interact with the printheads by receiving ink discharged from the printheads;

winding the at least one of the separated first web and the separated second web onto the take up spool assembly through the web guide, wherein the separated first web or the separated second web is a portion of the first web or the separated second web having saturated ink, and wherein the take up spool assembly comprises a first take up spool to wound the separated first web and a second take up spool to wound the second separated web;

removing the take up spool having the first or second separated web and supply spool having the separated first or second web from the web cartridge;

obtaining a replacement supply spool assembly having a first or second replacement web wound thereon and a corresponding first or second replacement take up spool assembly;

inserting the first or second replacement supply spool assembly and the first or second replacement take up spool assembly into the web cartridge;

feeding an end of the first or second replacement web through the web guide;

and affixing a portion of the end of the first or second replacement web to the corresponding first or second replacement take up spool assembly.

9. The method of claim 8 further comprising: manually turning the corresponding first or second replacement take up spool assembly to advance the first or second replacement web through the web guide and observing the replacement web advancing through the web guide to confirm that the first or second replacement web has been properly installed.

10. The method of claim 8 further comprising: assuring that there are no twists in the first or second replacement web prior to inserting the replacement supply spool assembly into the web cartridge.

11. The method of claim 8 further comprising: cleaning the web guide prior to feeding an end of the first or second replacement web through the web guide.

12. The method of claim 8, wherein the first or second replacement web is affixed to the corresponding first or second replacement take up spool assembly using adhesive.

13. The method of claim 8, wherein separating the first or second web from the supply spool assembly comprises severing the first or second web adjacent to the supply spool assembly.

14. The method of claim 8 further comprising:

severing a second web;

winding the severed second web onto the take up spool assembly;

feeding an end of a second replacement web through the web guide; and affixing a portion of the end of the second replacement web to the corresponding second replacement take up spool assembly.

* * * * *